United States Patent [19]
Howe et al.
[11] 3,811,185
[45] May 21, 1974

[54] METHOD FOR ENHANCING $V_3$ GA THIN FILM GROWTH

[75] Inventors: David G. Howe, Greenbelt, Md.; Russell A. Meussner, Washington, D.C.

[73] Assignee: The United States of America as represented by the Secretary of the Navy, Washington, D.C.

[22] Filed: Mar. 23, 1973

[21] Appl. No.: 344,402

[52] U.S. Cl. .................. 29/599, 29/199, 148/127, 174/DIG. 6, 335/216
[51] Int. Cl. .................. H01v 11/14
[58] Field of Search ........ 29/599, 199; 174/126 CP, 174/DIG. 6; 335/216; 148/127

[56] References Cited

UNITED STATES PATENTS

| | | | |
|---|---|---|---|
| 3,336,658 | 8/1967 | Husni | 174/DIG. 6 |
| 3,618,206 | 11/1971 | Gubler et al. | 29/599 |
| 3,625,662 | 12/1971 | Roberts et al. | 174/DIG. 6 |
| 3,713,898 | 1/1973 | Giorgi et al. | 335/216 X |
| 3,728,165 | 4/1973 | Howlett | 29/599 X |
| 3,731,374 | 5/1973 | Suenaga et al. | 29/599 |
| 3,737,824 | 6/1973 | Coles | 174/DIG. 6 |

FOREIGN PATENTS OR APPLICATIONS

| | | | |
|---|---|---|---|
| 1,039,316 | 8/1966 | Great Britain | 29/599 |

*Primary Examiner*—Charles W. Lanham
*Assistant Examiner*—D. C. Reiley, III
*Attorney, Agent, or Firm*—R. S. Sciascia; Arthur L. Branning

[57] ABSTRACT

A process for enhancing the growth of A15 intermetallic superconductors which removes impurities that are likely to form diffusion barriers impeding growth.

7 Claims, 6 Drawing Figures

METHOD FOR ENHANCING $V_3$ GA THIN FILM GROWTH

BACKGROUND OF THE INVENTION

This invention relates to the formation of superconductive materials more particularly it relates to a novel process by which both the rate of growth of the superconductive material and the properties of said material are enhanced.

In recent years superconductive materials have been proposed for use in many diversified applications. These include power transmission, levitated electromagnetic land transportation systems, naval propulsion systems, aircraft ac generators, and large laboratory research magnets. Superconducting generators may be only one-tenth to one-third the size of conventional electrical generators of the same power rating. Savings are realized in operating these systems when superconductive materials with high critical temperature, critical current, and critical field are used.

The intermetallic A15 compounds, i.e. $V_3Ga$, posses a high critical temperature and one of the highest critical fields as well as a good critical current-carrying capacity. However, the $V_3Ga$ intermetallic compound is extremely brittle and is very difficult to work metallurgically. Recently, $V_3Ga$ has been formed through a solid-state reaction process. The material is processed as a ductile Cu-Ga wire with a pure vanadium core, and a $V_3Ga$ interfacial layer is formed by a high-temperature reaction as the last step in the processing. Superconductors produced in this manner exhibit a critical temperature of about 14°K. By the process of the present invention superconductors are formed which not only exhibit a critical temperature of about 15°K, but exhibit a high rate of growth as well.

SUMMARY OF THE INVENTION

Briefly the invention relates to a process of eliminating any diffusion barrier between the interfacial layers of the solid-state reactants.

It is therefore an object of the invention to provide a process by which superconductive materials are produced.

It is another object of the invention to enhance the rate of growth of the superconductive material.

Another object of the invention is to provide a method by which the superconductive material produced exhibits a high critical temperature, critical current and field.

Other objects, advantages and novel features of the invention will become apparent from the following detailed description of the invention when considered in conjunction with the accompanying drawings wherein:

DETAILED DESCRIPTION

Figure 2:
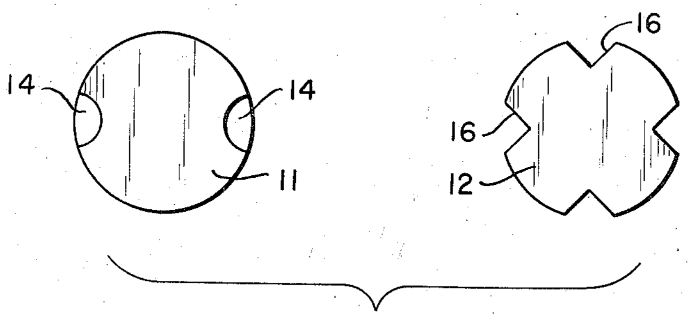
FIG. 2 is an end view of the rod and the end plug.
Figure 1:
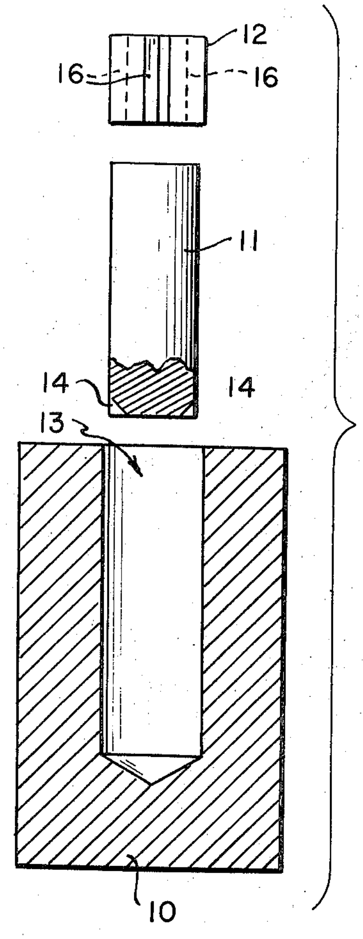
FIG. 1 illustrates a cross section of an unassembled sheath, rod and end plug used to produce the superconductor.
Figure 3:
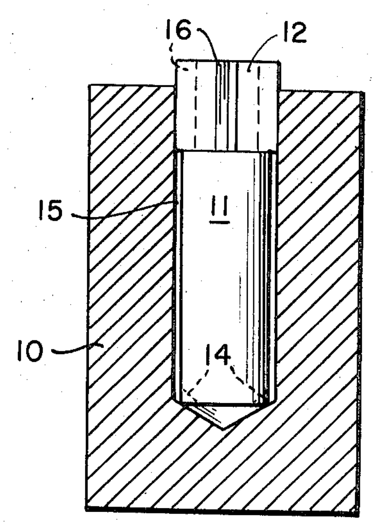
FIG. 3 is a cross section of the sheath, rod and plug assembled as a composite.

The invention relates to a novel process for producing superconductive materials, such as $V_3Ga$, $Nb_3Sn$ and $V_3Si$. FIG. 1 illustrates in an unassembled state the elements used to produce the superconductor. The sheath, 10, provides a tapered bore 13 into which the core rod 11 and the copper end plug 12 are inserted as illustrated by FIG. 3. The diameter of the bore relative to that of the core rod is such that when assembled an annular air space, 15, of about 0.005 inches is created. The end plug 12 must be of sufficient length so that when assembled as the composite illustrated by FIG. 3, the end plug extends out of the sheath. The end plug is provided with axial grooves, 16, about its periphery so that air can be evacuated from the annular space 15. The core rod 11 also has indentations or grooves, 14, at one end. These elements, the sheath, rod and end plug can be produced by an known technique, such as arc melting or induction melting.

While the end plug is copper, the composition of the sheath 10 and core rod 11 are dependent upon the composition of the superconductor to be formed. The following table lists the compositions of the various elements.

| | Superconductor Desired | Composition of Sheath | Composition of Core Rod |
|---|---|---|---|
| I | $V_3Ga$ | Cu-Ga | V-Ga |
| II | $Nb_3Sn$ | Cu-Sn | Nb-Sn |
| III | $V_3Si$ | Cu-Si | V-Si |

It can be seen then that the sheath is formed of a Cu alloy while the core rod is formed from an alloy of the materials desired to form the superconductor. The composition of the core rod can be referred to as V-xGa, Nb-ySn or V-zSi. For best results, $x$ ranges from 0 to 8 atomic percent, $y$ ranges from 0 to 2 atomic percent and $z$ ranges from 0 to 4.5 atomic percent.

Figure 4:
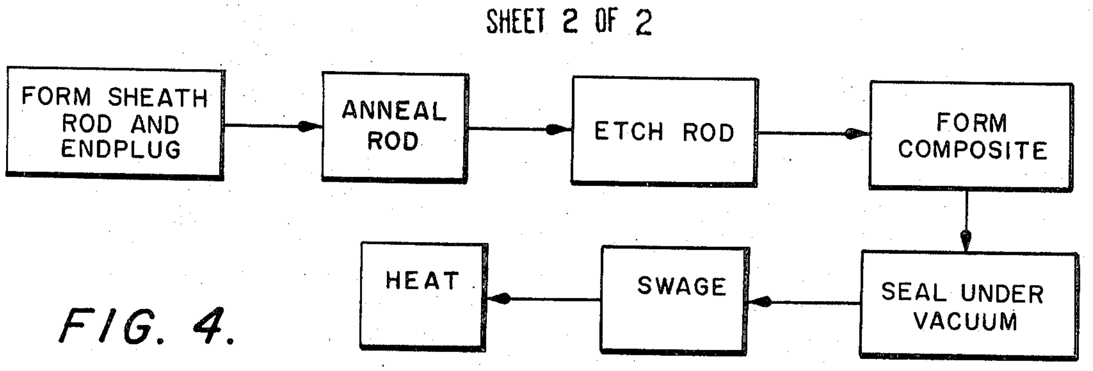
FIG. 4 is a flow chart describing the steps of the invention.

Having formed the sheath, rod and end plug, the superconductor is then formed by the process outlined in FIG. 4. First the rod is annealed at a temperature of about 800°C for approximately 10 to 20 hours. The rod is then cleaned by etching it with a nitric HF solution. A preferred solution is 10 $H_2O$:10 $HNO_3$4HF. The composite is then formed by placing the rod 11 and end plug 12 within the sheath 10 as shown by FIG. 3, leaving an annular air space 15. The composite is placed under high vacuum in the range of $1 \times 10^{-5}$ Torr or better so that the air space 15 is evacuated and the composite is then sealed. The sealing can be accomplished by welding the end plug to the sheath with the use of an electron beam, laser and the like. By vacuum sealing the composite, any air and other impurities which could cause a diffusion barrier are removed.

The composite is then swaged or drawn so that it is reduced in diameter. This results in a co-axial wire which is either placed in an evacuated silica ampoule and heated in a furnace at constant temperature between 550°C and 880°C or heated between 550° to 880°C in an inert atmosphere under high vacuum. During this heat treatment the superconductor is formed or "grown" by diffusion occurring at the interface of the rod and sheath.

When the superconducting layer has been formed, the coaxial wire is removed from the furnace and is ready to be used as a superconductive material.

By providing the rod and end plug with grooves etching the rod to both clean as well as form an active surface and sealing the composite under vacuum, the growth rate of the superconductor is enhanced.

Figure 5:
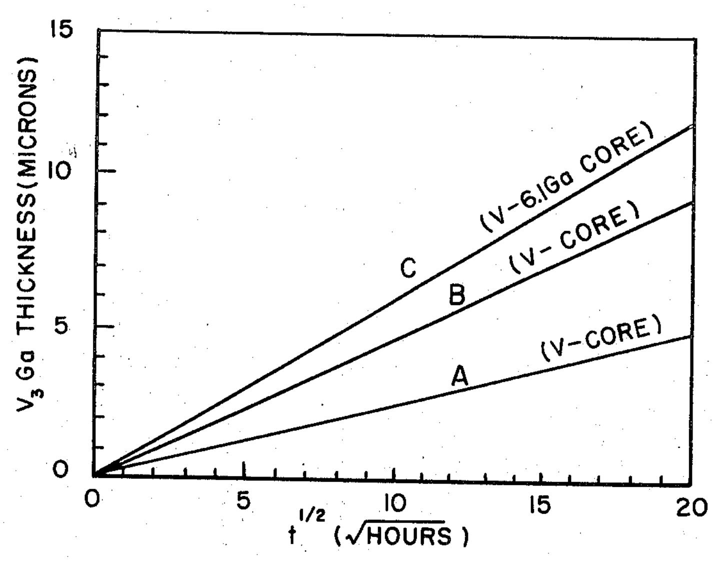
FIG. 5 illustrates a graphic comparison of the rate of growth of the superconductor produced in accordance with the present invention and the rate of growth of a superconductor produced according to prior art techniques.

FIG. 5 illustrates the results of various tests comparing the growth rate of superconductors formed according to the present invention and that grown according to the technique taught by M. Suenaga and W. B. Sampson, *Appl. Phys. Ltrs.*, 18:54, June 15, 1971. The plot relates the thickness of the superconductor, $V_3Ga$, versus time at a temperature of 700°C. Plot A refers to the prior art. Plots B and C are of those superconductors formed by the present invention. The results of Plot B were taken from tests in which the core rod used was pure vanadium (V) while the results of plot C were taken from tests in which the core rod used was a V-Ga alloy in which 6.1 atomic percent Ga was present. The graph clearly shows that for any given period of time the rate of growth of the superconductor produced in accordance with the present invention was superior to that of the prior art. It also shows that the alloyed core resulted in a higher rate of growth than the pure V core.

Figure 6:
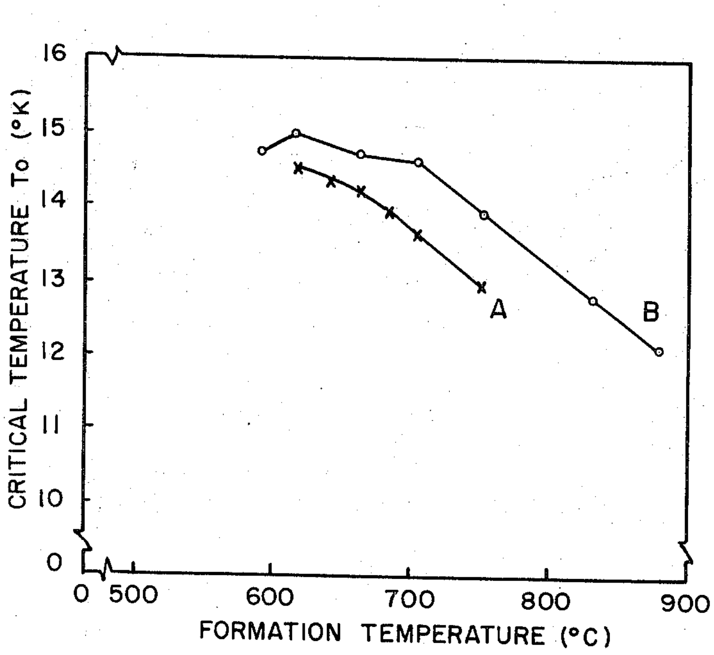
FIG. 6 illustrates a graphic comparison of the critical temperature of a superconductor produced in accordance with the present invention and the critical temperature of a superconductor produced according to prior art techniques.

FIG. 6 illustrates the results of various tests comparing the critical temperature of $V_3Ga$ grown by the process of the present invention and that grown according to the *Appl. Phys. Ltrs.* article referred to above. Plot A refers to the prior art. Plot B refers to $V_3Ga$ grown in accordance with the invention in which a V-Ga core rod containing 6.1 atomic percent Ga was used. The figure illustrates that critical temperature of $V_3Ga$ grown by the process of the invention is higher than that of the prior art regardless of the formation temperature.

The process of the invention results in not only a superconductor having superior properties, but the rate of growth of the suprrconductor is also superior to that of the prior art.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of forming a superconductor selected from the group consisting of $V_3Ga$, $Nb_3Sn$, and $V_3Si$, respectively, said method comprising:

- forming a sheath comprising an alloy selected from the group consisting of Cu-Ga, Cu-Sn, and Cu-Si, respectively;
- forming a core rod having grooves at one end, said rod being composed of an alloy selected from the group consisting of V-xGa, Nb-ySn, and V-zSi, respectively, wherein $x$ is 0 to 8 atomic percent, $y$ is 0 to 2 atomic percent and $z$ is 0 to 4.5 atomic percent;
- forming a copper end plug having axial grooves about its periphery;
- annealing said core rod;
- etching said rod with a nitric HF solution;
- placing said rod and plug within said sheath whereby a composite is formed having an annular air space between said sheath and said rod, said plug being of sufficient length to overlap the end of said sheath;
- subjecting said composite to vacuum;
- sealing said composite while under vacuum;
- reducing the diameter of said composite; and
- heating said reduced composite at 550°C to 880°C whereby said superconductor is formed.

2. A method according to claim 1 wherein said annealing step is carried out at 800°C for about 10 to 20 hours.

3. A method according to claim 1 wherein said nitric HF solution is 10 $H_2O$:10 $HNO_3$4HF.

4. A method according to claim 1 wherein the composite is subjected to a vacuum pressure of $1 \times 10^{-5}$ Torr.

5. A method according to claim 1 wherein the composite is reduced in diameter by swaging.

6. A method according to claim 1 wherein the composite is reduced in diameter by drawing.

7. A method of forming a superconductor selected from the group consisting of $V_3Ga$, $Nb_3Sn$, and $V_3Si$, respectively, said method comprising:

- forming a sheath comprising an alloy selected from the group consisting of Cu-Ga, Cu-Sn, and Cu-Si, respectively;
- forming a core rod having grooves at one end, said rod being composed of an alloy selected from the group consisting of V-xGa, Nb-ySn, and V-zSi, respectively, wherein $x$ is 0 to 8 atomic percent, $y$ is 0 to 2 atomic percent and $z$ is 0 to 4.5 atomic percent;
- forming a copper end plug having axial grooves about its periphery;
- annealing said core rod at 800°C for about 10 to 20 hours;
- etching said rod with a solution of 10 $H_2O$:10 $HNO_3$4HF;
- placing said rod and plug within said sheath whereby a composite is formed having an annular air space between said sheath and said rod, said plug being of sufficient length to overlap the end of said sheath;
- subjecting said composite to vacuum at $1 \times 10^{-5}$ Torr;
- sealing said composite while under vacuum;
- swaging said composite to reduce to diameter of said composite; and
- heating said composite at 550°C to 880°C whereby said superconductor is formed.

* * * * *